United States Patent [19]

Boundy

[11] Patent Number: 5,096,433
[45] Date of Patent: Mar. 17, 1992

[54] ELECTRIFIED SPACE DIVIDING PANEL SYSTEM

[75] Inventor: Bruce K. Boundy, Caledonia Township, Kent County, Mich.

[73] Assignee: Westinghouse Electric Corp., Pittsburgh, Pa.

[21] Appl. No.: 607,935

[22] Filed: Nov. 1, 1990

Related U.S. Application Data

[63] Continuation-in-part of Ser. No. 586,844, Sep. 24, 1990, abandoned.

[51] Int. Cl.⁵ .............................................. H01R 23/27
[52] U.S. Cl. .................................. 439/215; 439/505; 439/654
[58] Field of Search ............................ 439/207–216, 439/284, 287, 290, 291, 650, 654, 505

[56] References Cited

U.S. PATENT DOCUMENTS

| Re. 31,033 | 9/1982 | Wilson, Jr. et al. | 439/654 |
|---|---|---|---|
| 3,648,219 | 3/1972 | Goldman | 339/45 M |
| 3,841,042 | 10/1974 | Siegal | 52/239 |
| 4,043,626 | 8/1977 | Propst et al. | 439/215 |
| 4,060,294 | 11/1977 | Haworth et al. | 339/4 |
| 4,241,965 | 12/1980 | Wilson et al. | 439/207 |
| 4,270,020 | 5/1981 | Kenworthy et al. | 174/48 |
| 4,278,834 | 7/1981 | Boundy | 174/48 |
| 4,295,697 | 10/1981 | Grime | 439/215 |
| 4,313,646 | 2/1982 | Millhimes et al. | 339/156 R |
| 4,367,370 | 1/1983 | Wilson et al. | 439/215 |
| 4,376,561 | 3/1983 | Vanden Hoek et al. | 339/21 R |
| 4,382,648 | 5/1983 | Propst et al. | 439/209 |
| 4,579,403 | 4/1986 | Byrne | 339/9 E |
| 4,762,072 | 8/1988 | Boundy et al. | 108/50 |
| 4,775,328 | 10/1988 | McCarthy | 439/215 |
| 4,825,540 | 5/1989 | Kelly | 439/209 |
| 4,952,164 | 8/1990 | French et al. | 439/215 |

OTHER PUBLICATIONS

Shaw/Walker Tempo 3 Installation Manual, p. 37 (1987).

Primary Examiner—Gary F. Paumen

[57] ABSTRACT

An electrified space dividing panel system having a plurality of panels, with each panel having a power module which includes a terminal block having terminals for receiving up to and including four plug-in receptacles. The power module includes two flexible cables, one either fixed to or releasably engaged with, each longitudinal end thereof, with the flexible cables each having a length such that they reach to opposite ends of the associated panel. Each flexible cable has a T-shaped connector at its free end, with the T-shaped connector having first and second sets of hermaphroditic contacts arranged at right angles to one another, and first and second hermaphroditic housings disposed to respectively surround the first and second sets of hermaphroditic contacts. The T-shaped connectors of adjacent panels plug directly together at the intersection of two, three or four panels, eliminating the need for jumpers.

31 Claims, 6 Drawing Sheets

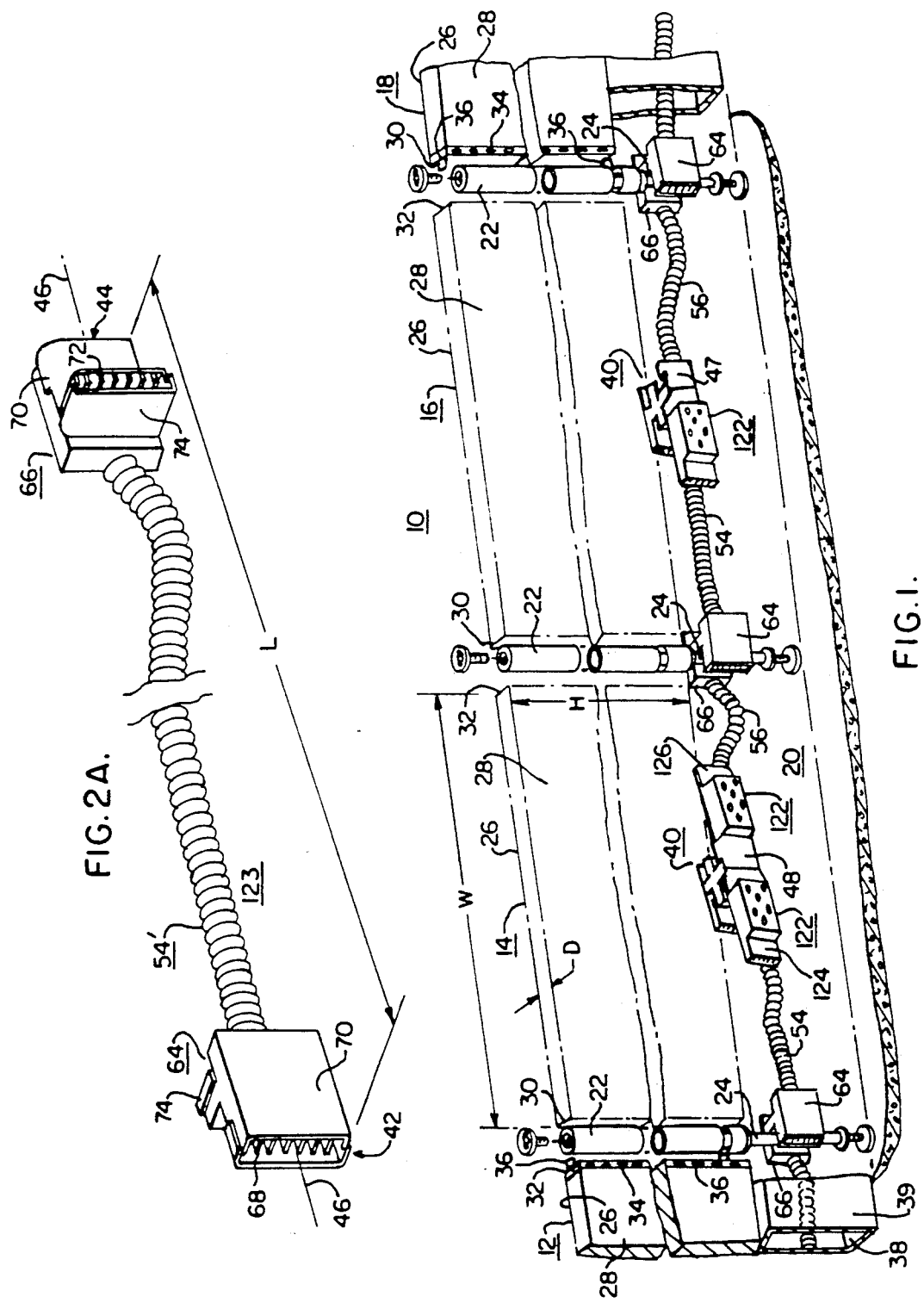

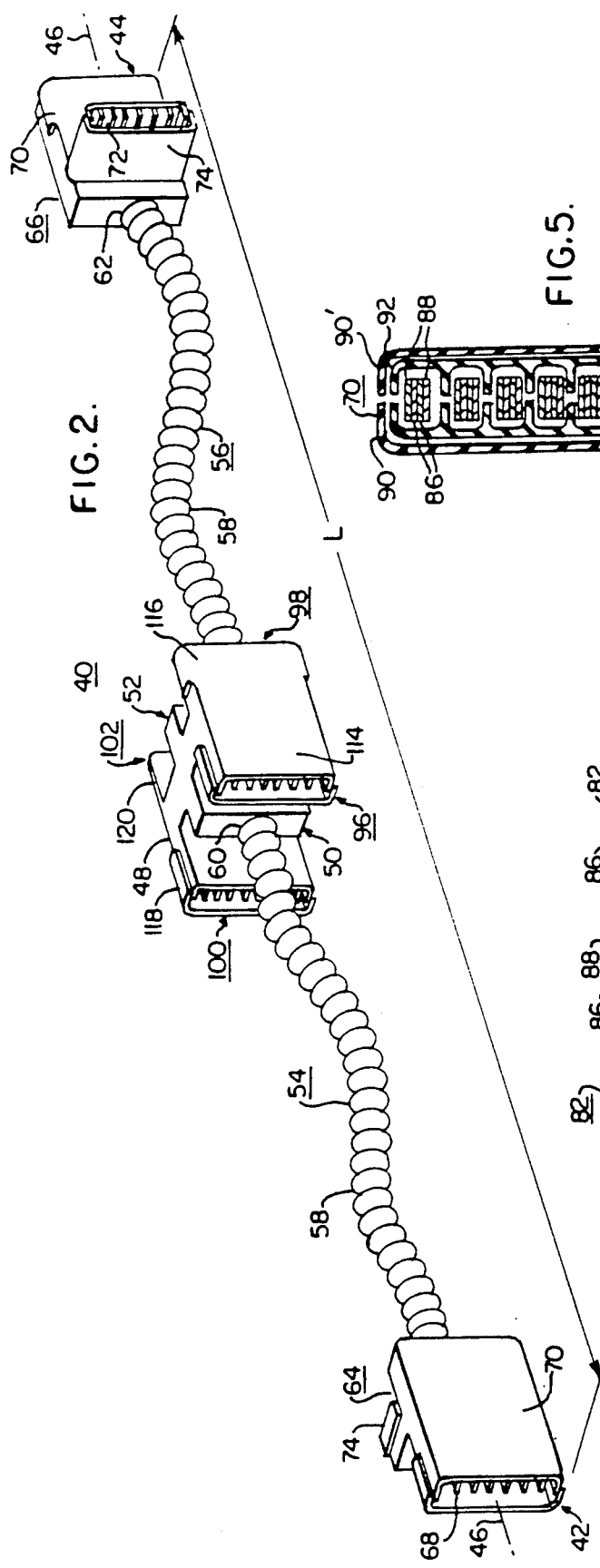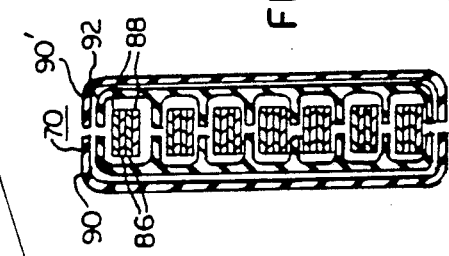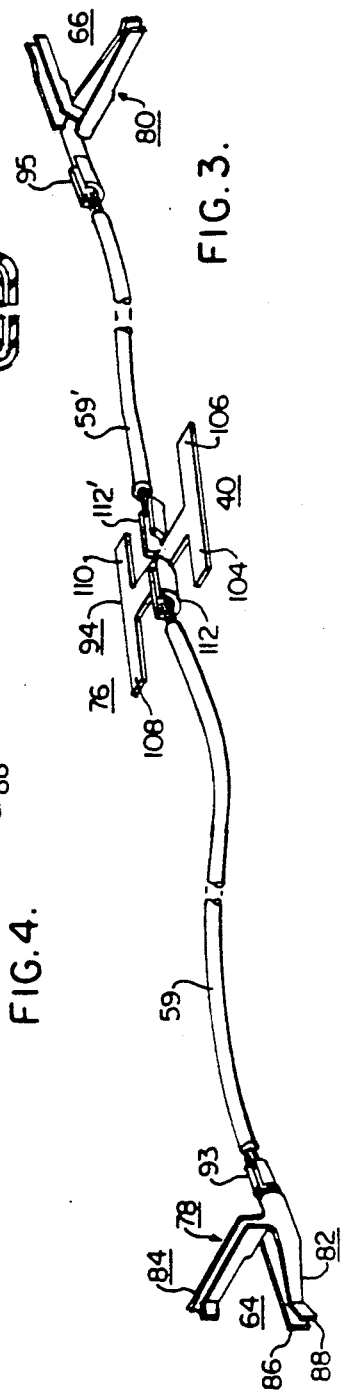

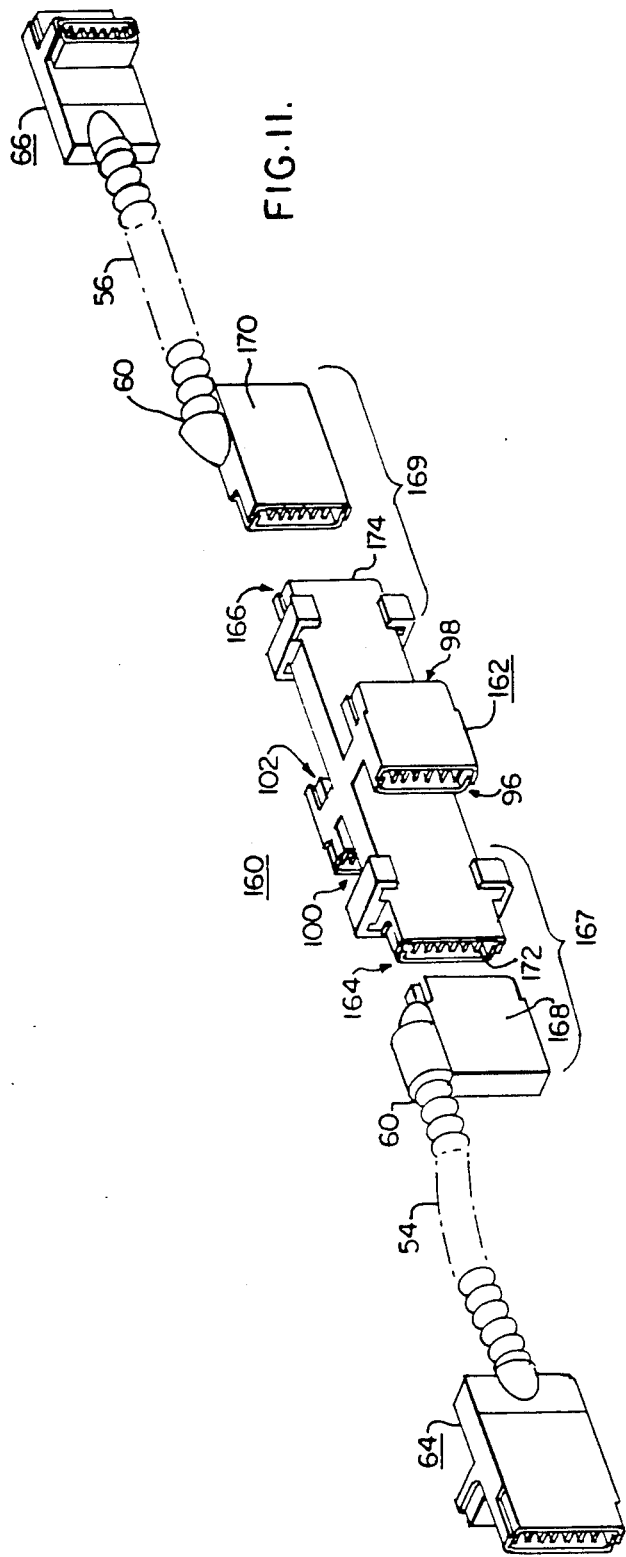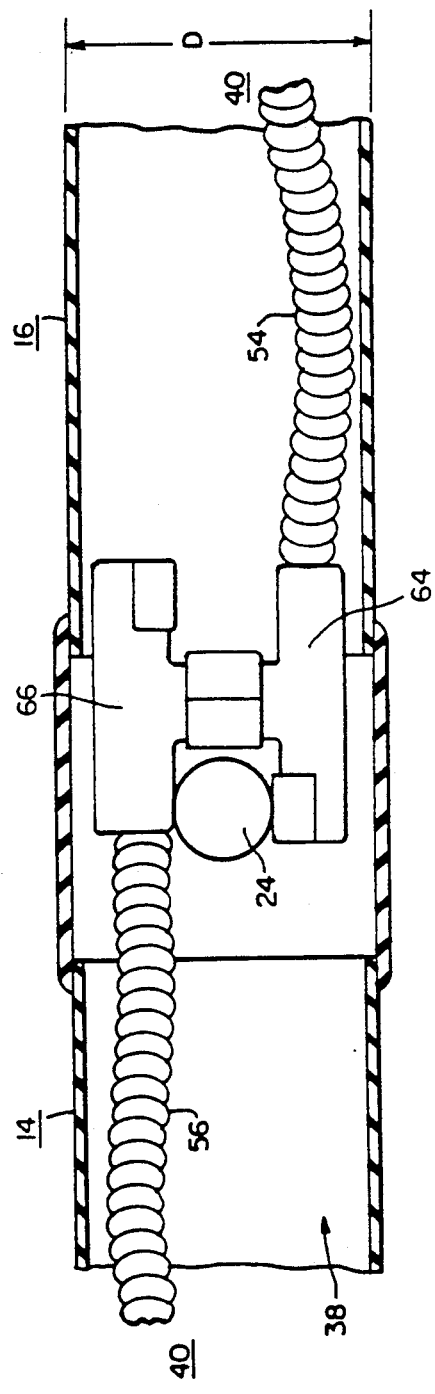

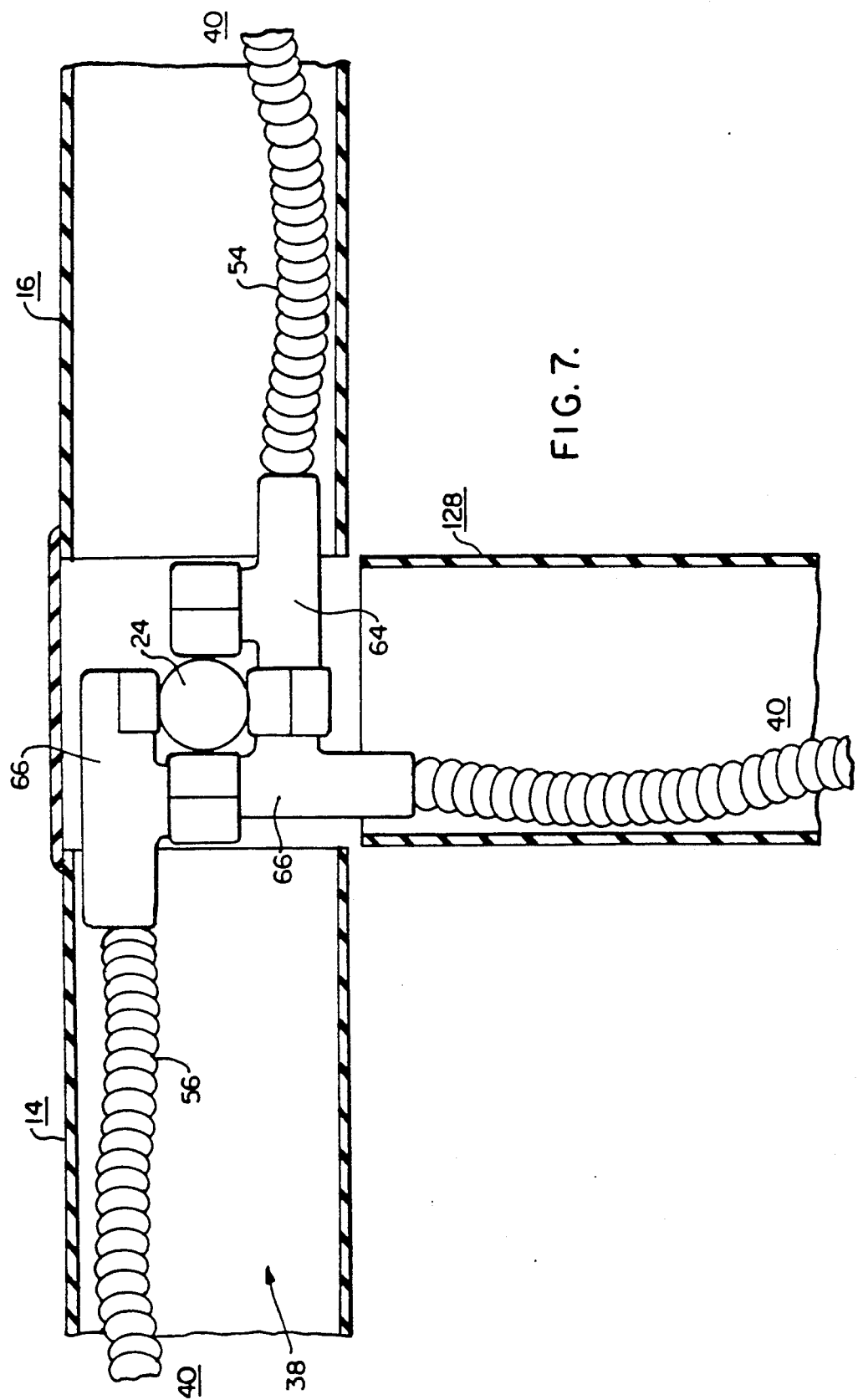

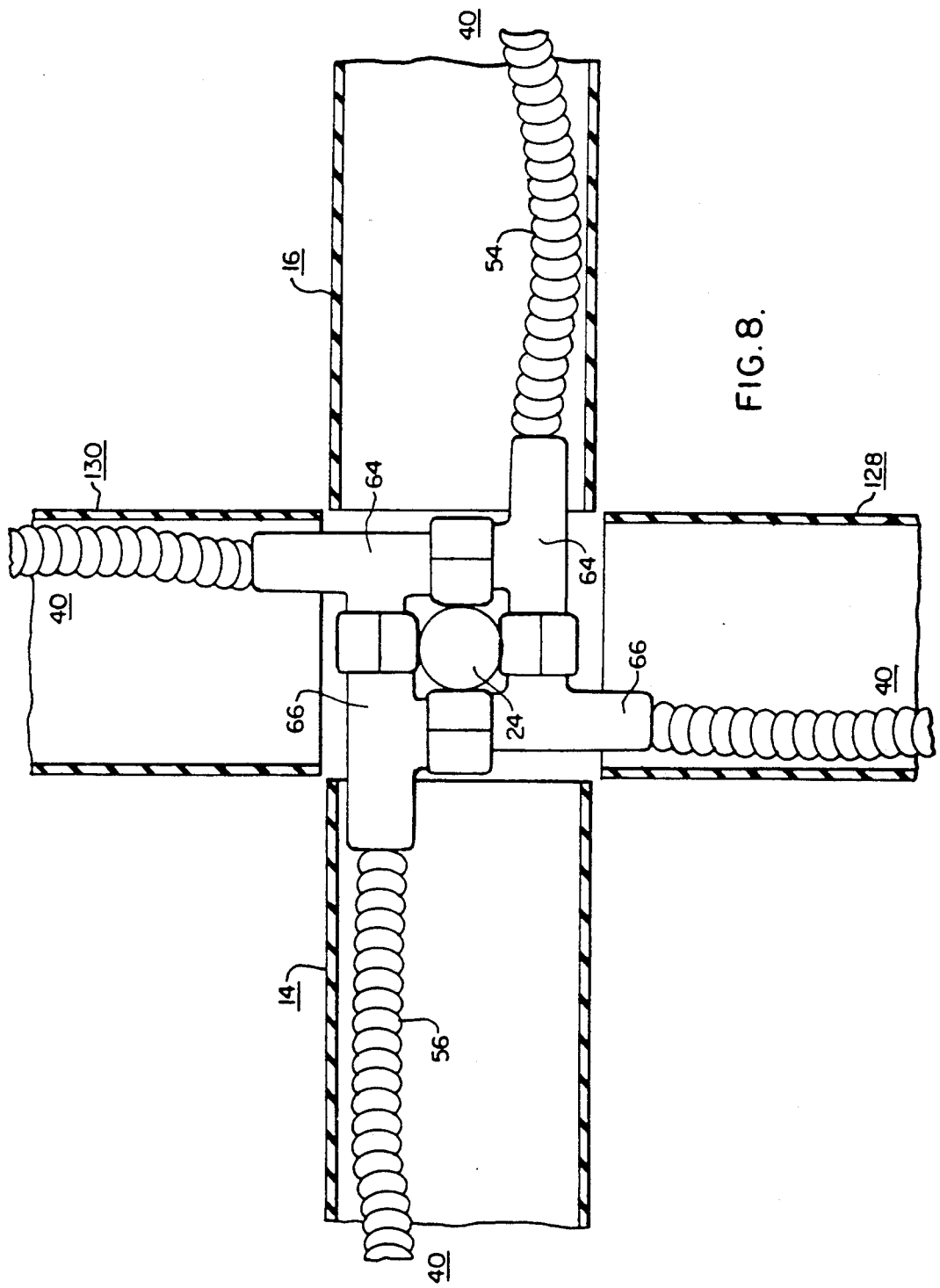

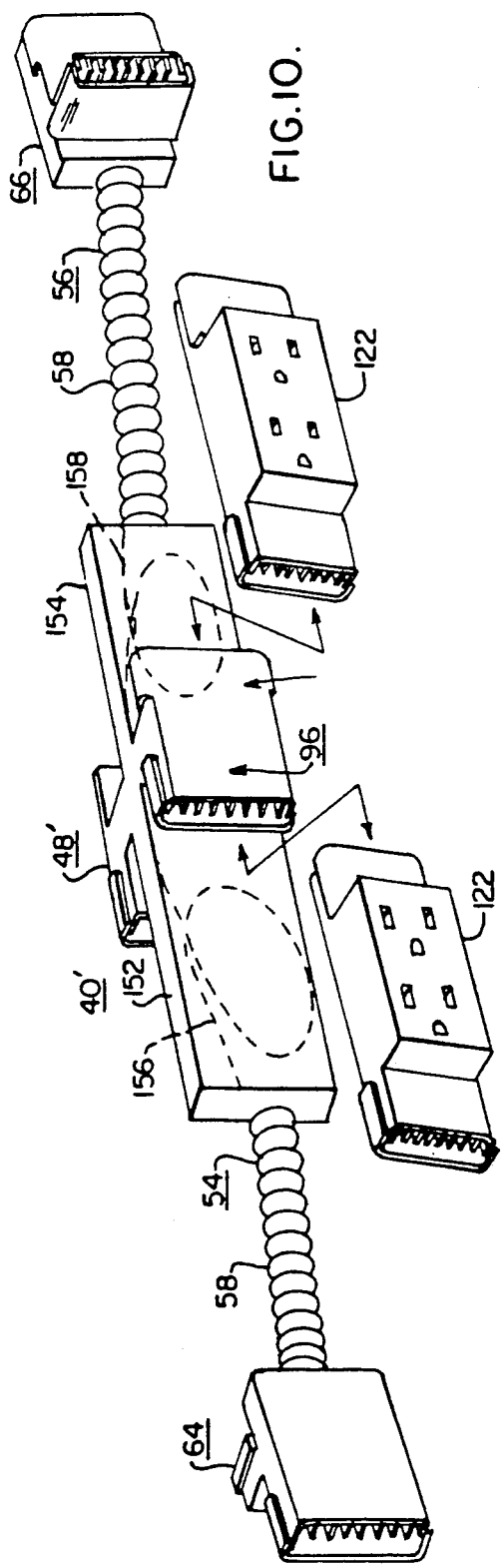
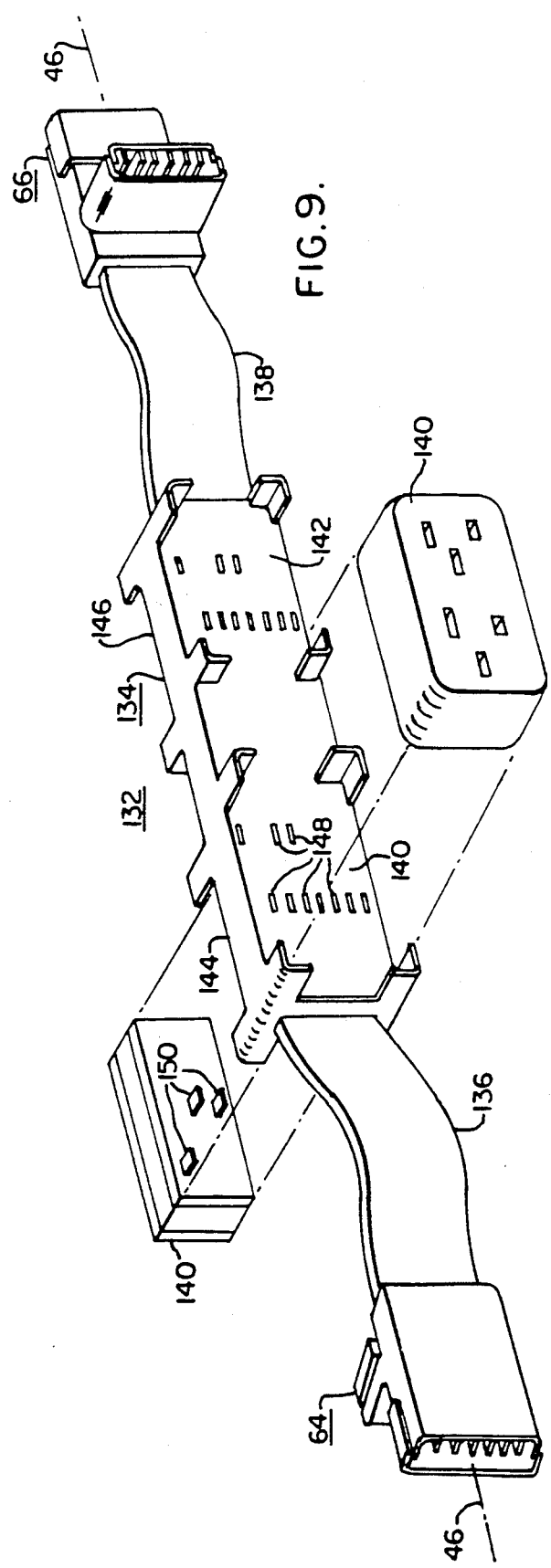

ELECTRIFIED SPACE DIVIDING PANEL SYSTEM

This is a continuation-in-part of application Ser. No. 07/586,944, filed Sept. 24, 1990, now abandoned.

TECHNICAL FIELD

The invention relates in general to space dividing open office systems furniture, and more specifically to such systems having plug-together electrical wiring.

BACKGROUND ART

The panels of space dividing open office systems furniture were originally electrified by hard wiring the panels with lay-in wiring, after the office configuration had been established by positioning of the panels. The inflexibility of this arrangement led to pre-wired panels which were interconnected via electrical jumpers, such as disclosed in Siegal U.S. Pat. No. 3,841,042. This early plug-together arrangement was "handed" or gendered, with female terminals at one vertical edge of an energized panel providing electrical power for an adjacent unit, via male terminals which were plugged into it. A disadvantage of a gendered system is the requirement that all of the electrified panels of the system must be oriented such that the end of the electrical module with male terminals will receive the power source. Since the electrical modules are normally hidden within the base of a panel, the installation procedure had to be slowed in order to insure the correct alignment of each panel relative to the power source.

A next generation of electrical modularity of open office systems panels overcame the disadvantage of the gendered system by providing the panel power module with terminals of the same gender on both ends of the panel, for example, female terminals, and then providing a short panel-to-panel jumper having terminals of the opposite gender, which would be male in this example, on both of its ends. The male terminals of these arrangements are shrouded for safety, or they are constructed such that they are energized during the act of engagement and de-energized during disengagement. Examples of this type of modular electrical system are U.S. Pat. Nos. Haworth et al 4,060,294; Boundy 4,278,834; Millhimes et al 4,313,646; and Vanden Hoek et al 4,376,561. This approach achieved panel symmetry, allowing a panel to be energized from either end.

While the present symmetrical systems perform well, they do require flexible jumpers which add part and tooling costs, they add substantially to the number of parts which must be ordered, counted and installed, and they greatly increase the number of termination points having voltage drop and reliability risk. Thus, it would be desirable, and it is an object of the present invention, to provide an open office furniture system having a modular electrical system which is symmetrical, and which preserves the advantages of present symmetrical, modular electrical systems while eliminating panel-to-panel jumpers.

SUMMARY OF THE INVENTION

Briefly, the present invention is a new and improved electrified space dividing panel system which includes a plurality of vertically oriented panels each having first and second major opposed sides which define panel width and height dimensions, first and second vertically oriented edges which interconnect the first and second opposed sides and define a panel thickness dimension, and an elongated opening or wire passageway which extends between the first and second vertically oriented edges. The panels are arranged relative to one another to provide the desired office arrangement, including intersections of two, three, and four panels wherein vertically oriented edges of adjacent panels are joined via suitable connectors, such as a post, a hinge, or the like.

An electrical power module is disposed in the elongated opening or wire way of each panel to be electrified, with each power module having first and second ends, a longitudinal axis between the first and second ends, and a length dimension between the first and second ends which is substantially equal to the width dimension of the associated panel. Each electrical power module further includes a single terminal block having first and second axial ends, first and second flexible multi-conductor cables having first ends connected to the first and second axial ends of the terminal block and second ends. First and second electrical connectors are disposed at the first and second ends of the electrical power module, respectively, with the first and second electrical connectors being integrally attached to the second ends of the first and second flexible cables, respectively. The single terminal block has terminals for receiving up to and including four plug-in electrical receptacles, such as up to and including two duplex plug-in receptacles per panel side.

Each of said first and second electrical connectors has at least one set of hermaphroditic contacts surrounded by a hermaphroditic housing. With hermaphroditic contacts and hermaphroditic housings, two identical terminals may be plugged together, eliminating the prior art panel-to-panel jumper. Thus, the at least one set of hermaphroditic contacts of an electrical connector of one panel directly engages the at least one set of hermaphroditic contacts of an electrical connector of another panel, with the engagement being at a location near the adjacent vertical edges of the adjacent panels.

In a preferred embodiment of the invention, each electrical connector has first and second sets of hermaphroditic contacts each surrounded by a hermaphroditic housing, with the contacts and housings being arranged orthogonally, i.e., at right angles to one another. Two sets of hermaphroditic contacts allows branching of the electrical circuits to additional panels at an intersection of panels, and the right angle relationship of the contacts enables such branching with a minimum of flexing of the multi-conductor electrical cable which interconnects the terminal block with the electrical connectors.

With a wire way having a depth of about three inches, for example, the flexible multi-conductor cables may be made long enough to be able to adjust the effective length of each cable by about one to one and one-half inch. This will enable the engagement of electrical conductors to be made on a selected side of a support post, for example, in systems which utilize posts as connectors between adjacent panels. With narrower wire ways, an embodiment of the invention provides means in each electrical module for safely stretching each multi-conductor cable by a dimension which enables engagement to be made on either the near or far side of a post. The T-shaped configuration of each electrical connector in the preferred embodiment, enables the electrical connectors to completely encircle a post when four electrified panels meet at a panel-to-panel joint or intersection.

BRIEF DESCRIPTION OF THE DRAWINGS

The invention may be better understood and further advantages and uses thereof more readily apparent when considered in view of the following detailed description of exemplary embodiments, taken with the accompanying drawings, in which:

FIG. 1 is a fragmentary perspective view, partially in phantom, of an electrified space dividing panel system constructed according to the teachings of the invention;

FIG. 2 is a perspective view of a power module shown in FIG. 1, illustrating a first embodiment thereof;

FIG. 2A is a perspective view of an electrical pass through jumper which is the same as the power module shown in FIG. 2 except it does not have a terminal block;

FIG. 3 is a perspective view of one of the plurality of electrical circuits in the power module shown in FIGS. 1 and 2;

FIG. 4 is a fragmentary elevational view which illustrates engagement of hermaphroditic contacts;

FIG. 5 is a cross sectional view through the engagement of two sets of hermaphroditic contacts, each surrounded by a hermaphroditic housing;

FIG. 6 is a cross sectional plan view through the wire ways of a 180 degree intersection of two panels, illustrating the location of engaged electrical connectors in a panel system having posts as panel connectors;

FIG. 7 is a cross sectional plan view through the wire ways of a T-intersection of three panels, illustrating the location of engaged electrical connectors in a panel system having posts as panel connectors;

FIG. 8 is a cross sectional view through the wire ways of a four-way panel intersection, illustrating the location of engaged electrical connectors in a panel system having posts as panel connectors;

FIG. 9 is a perspective view of an electrical power module constructed according to another embodiment of the invention, with rear engagement type plug-in electrical receptacles shown exploded from the terminal block;

FIG. 10 is an exploded perspective view of still another electrical power module constructed according to an embodiment of the invention in which the module has an adjustable length dimension between its longitudinal ends; and FIG. 11 is a perspective view of a power module which is similar to the power module shown in FIG. 2, except illustrating an embodiment in which flexible cables are releasably engaged with a terminal block.

DESCRIPTION OF PREFERRED EMBODIMENTS

Referring now to the drawings, and to FIG. 1 in particular, there is shown an electrified space dividing system 10 constructed according to the teachings of the invention. System 10 includes a plurality of vertically oriented space dividing panels, with four panels 12, 14, 16 and 18 being illustrated. Panels 14 and 16 are shown in phantom in order to more clearly illustrate a modular electrical system 20 mounted in the base of the panels. Space dividing system 10 is illustrated as having panel-to-panel connectors in the form of posts 22, as posts complicate the placement of the electrical components of an electrical system. It is to be understood that other types of panel-to-panel connectors may be used, such as a hinge, or a clamping type of connector which firmly clamps elements of adjacent panels together. It will be apparent from the following description that electrical system 20 easily accommodates the bottom portion or stem 24 of posts 22, and thus a connector system which places the vertical edges of the panels directly together will be even more easily accommodated than the post system illustrated. The hereinbefore mentioned Boundy U.S. Pat. No. 4,278,834 illustrates a post system in detail.

Each panel has first and second major opposed sides 26 and 28 which define panel width and height dimensions W and H, respectively. Each panel further has first and second vertically oriented edges 30 and 32, respectively, which interconnect the first and second opposed sides 26 and 28 and define a panel thickness or depth dimension D. As illustrated relative to panels 12 and 18, each vertical edge 30 and 32 may be defined by a slotted standard 34 which aids is supporting desks and accessories from panels, and each vertical edge 30 and 32 includes hooks 36 for engaging a post 22.

Each panel to be electrified includes means defining an elongated opening 38 which extends between the first and second vertically oriented edges 30 and 32. Opening 38 may be an integral part of each panel, but in most instances opening 38 will be defined by a separate structure such as a wire way or a raceway 39 which is attached to the bottom edge of a frame which defines the outer edges of each panel. Electrical system 20 does not require a "raceway" in the technical sense of the term, as all wiring is protected in such a manner that raceway construction is not required by electrical codes.

Panels 12, 14, 16 and 18 are shown interconnected in a straight line, but a plurality of panels may be supported by a post 22 in any desired angular relationship relative to one another, such as a T-shaped configuration of a three-panel intersection, shown in FIG. 6, and a cross-shaped configuration of a four-panel intersection, shown in FIG. 7.

Modular electrical system 20 includes a single electrical power module 40 per panel, with the electrical power module being installed in the elongated opening 38 at the base of each electrified panel. Electrical power module 40, as shown more clearly in FIG. 2, has first and second ends 42 and 44, respectively, a longitudinal axis 46 which extends between its ends, and a length dimension L between the first and second ends which is substantially equal to the width dimension W of the associated panel.

Each electrical power module 40 includes a single terminal block 48 having first and second axial ends 50 and 52, respectively, and first and second flexible multi-conductor cables 54 and 56. In the embodiment illustrated in FIGS. 1 and 2, each cable 54 and 56 has a flexible armored metallic shell 58 surrounding a plurality of wires, such as wires 59 and 59' shown in FIG. 3, which make up the cable. Festoon cable may also be used, in which the conductors are embedded in a heavy-duty plastic shell. Each of the cables 54 and 56 has a first end 60 connected to an axial end 50 or 52 of the terminal block 48, and a second end 62. First and second electrical connectors 64 and 66 are integrally attached to the second ends 62 of the flexible cables 54 and 56.

Electrical connectors 64 and 66 are of like construction. Each connector 64 and 66 has at least one set 68 of hermaphroditic contacts surrounded by a hermaphroditic housing 70, and in a preferred embodiment of the invention, each connector 64 and 66 has a second set 72 of hermaphroditic contacts surrounded by a hermaphroditic housing 74. Hermaphroditic contacts are genderless. i.e., two identical contacts of this type may be plugged together or electrically engaged. Hermaphroditic housings permit the insulative housings which surround the hermaphroditic contacts to plug together. While the first and second sets 68 and 72 of hermaphroditic contacts may be arranged side by side. ie., having the access openings face the same way, in a preferred embodiment of the invention the first and second contact sets 68 and 72 are arranged orthogonally, ie., at right angles relative to one another. The right angle orientation of the contact sets 68 and 72 makes it unnecessary to flex the cables 54 and 56 with a sharp curve or bend when connecting one connector to another, regardless of the angular orientation between the adjacent panels being electrically interconnected.

FIG. 3 is a perspective view of one electrical circuit 76 of electrical power module 40. with the remaining electrical circuits being of like construction. It is common in electrified space dividing panel systems of today to have six or eight electrically conductive paths or wires. with three or four of the wires being energized and the remaining wires being neutral and ground conductors. Electrical circuit 76 includes like hermaphroditic contact structures 78 and 80 associated with electrical connectors 64 and 66. respectively. Contact structure 78 includes first and second contacts 82 and 84 of like construction, which are associated with contact sets 68 and 72. respectively.

The first contact 82. and thus the second contact 84. since they are identical. includes first and second contact elements 86 and 88 which cooperatively form a female contact, and one element. such as element 86. functions as a male contact when engaging a like female contact of a hermaphroditic contact from another electrical connector. This engagement of two like hermaphroditic contacts 82 is shown in FIG. 4.

FIG. 5 is a cross sectional view through engaged hermaphroditic contacts and hermaphroditic housings, such as contact set 68 or 70 of electrical connector 64 engaged with contact set 68 or 70 of electrical connector 66, and housing 70 or 74 of electrical connector 64 cooperatively mating with housing 70 or 74 of electrical connector 66. For purposes of example, it will be assumed that housing 70 of connector 64 is mated with housing 74 of connector 66 in FIG. 5. Hermaphroditic housing 70 has first and second halves 90 and 92, and hermaphroditic housing 74 has first and second halves 90' and 92' which are identical to the first and second halves 90 and 92, respectively. Housing half 90 is slightly larger than housing half 92, with their relative dimensions being such that housing half 90 accepts and surrounds housing half 92', and housing half 90' accepts and surrounds housing half 90, when two sets of hermaphroditic contacts are plugged together.

Contact structures 78 and 80 include ferrules 93 and 95 which are crimped to secure the first ends of electrical wires 59 and 59', and the second ends of the wires 59 and 59' are fastened to an electrical bus structure 94 associated with terminal block 48. If desired, wires 59 and 59' may be a single wire stripped at its ends, and also in the center for connection to bus structure 94. Terminal block 48 includes first, second, third and fourth sockets 96. 98. 100 and 102, respectively, with the first and second sockets, in this embodiment, facing in opposite directions. and being accessible from major side 28 of a panel. and with the third and fourth sockets 100 and 102 facing in opposite directions and being accessible from major side 26 of a panel.

Sockets 96, 98, 100 and 102 include a plurality of bus structures similar to bus structure 94 shown in FIG. 3, with one common circuit of sockets 96, 98, 100 and 102 including contact elements 104, 106, 108 and 110, respectively, of bus structure 94. Contact elements 104, 106, 108 and 110 form an H-shaped configuration, with the center leg of the H-shaped configuration including means such as ferrules 112 and 112' for attaching the second ends of the wires 59 and 59' securely to the bus structure 94. The plurality of bus structures 94 are partially embedded in electrical insulation which forms hermaphroditic housings 114, 116, 118 and 120, similar to the hermaphroditic housings 70 and 74, which housings surround free ends of contact elements 104, 106, 108 and 110.

As shown in FIG. 1, sockets 96, 98, 100 and 102 are each configured to accept a plug-in receptacle 122, which are commercially available from Pent, Inc. Each plug-in receptacle 122 has first and second hermaphroditic housings 124 and 126 at opposite longitudinal ends which surround female contacts (not shown) which accept male contact elements 104, 106, 108, or 110 of the bus structures 94 when a plug-in receptacle 122 is plugged into one of the sockets 96, 98, 100 or 102. While duplex receptacles are illustrated, the receptacles may have any reasonable number of conventional sockets. When duplex receptacles 122 are plugged into sockets 96 and 98, and/or sockets 100 and 102, and/or sockets at diagonally opposite corners, the overall length of the terminal block/receptacle combination is about 10 inches, and this terminal block is preferably substantially centered in the associated panel.

The overall length L of each electrical power module 40 is related to the width of the associated panel, and its actual length is determined by the type of pane, to panel connectors used in the space dividing panel system 10. The concept is to make length L equal to that length which will enable one module to plug directly into a module of an adjacent panel at a location substantially between the panels, and thus it may be said that the length L is substantially equal to the width W of the panel it is associated with. If the panel-to-panel connectors used are such that the edges 30 and 32 are disposed directly against one another, then "substantially equal" means that the length L would be just slightly longer than the width L. If the panel-to-panel connectors include a post 22, then "substantially equal" means that the length L would be just slightly longer than the panel width W plus the distance by which adjacent panel edges are separated by the post. Thus, the electrical connections between panels are not spaced inwardly from the panel edges, but they are all made at a convenient location which corresponds approximately to the intersection of adjoining panels. Further, separate panel-to-panel jumpers are not required. The complete electrical system is comprised of just one power module per electrified panel and any desired number of plug-in electrical receptacles per panel, up to and including four, with none, one or two, as desired, being accessible from each major side of the electrified panel.

When a panel does not require a terminal block 48, a pass through electrical jumper 123, shown in FIG. 2A, may be provided which is identical to an electrical module 40 shown in FIG. 2 except the cable is continuous between the electrical connectors at the ends, eliminating the terminal block 48. Thus, it is not necessary to describe electrical pass through jumper 123 in detail. Pass through jumper 123 would have connectors 64 and 66 at its ends, with cables 54 and 56 being a single cable 54'. Pass through jumper 123 has the same advantages as the electrical module 40 in that it would make connections to other modules 40 between panels, the same as if the jumper 123 had a terminal block 48.

FIG. 6 is a cross-sectional plan view of panels 14 and 16 taken through the elongated opening or wire way 38, just above the electrical modules 40, illustrating the engagement of electrical connectors 64 and 66. Electrical connectors 64 and 66 are dimensioned such that they partially surround the stem 24 of post 22. It will be noted that connector 66 extends just past the stem 24 while connector 64 extends just up to stem 24. The length L of a power module 40 is selected such that straightening cable 54 or 56 to cause it to achieve its full length will place the associated electrical connector in the position of connector 66. Causing a cable 54 or 56 to assume a serpentine position shortens the effective length of the cable, enabling the associated connector to be located in the position of connector 64. If the thickness or depth D of the wire way 38 is too narrow to reduce the length of a cable to the point where the connector can be positioned where connector 64 is positioned, the power module may be modified as will be hereinafter described relative to an embodiment of the invention shown in FIG. 10.

FIG. 7 is a view similar to that of FIG. 6, except illustrating an electrified panel 128 connected to the same post that panels 14 and 16 are connected to, to form a T-shaped configuration when the panels are viewed from above. Electrified panel 128 is identical to the electrified panels already described, and either end of panel 128 may be placed at the intersection of panels 14 and 16 and electrically connected thereto. For purposes of example in order to give reference numerals to the electrical connector associated with panel 128, it will be assumed that the electrical connector identified with reference 66 is connected to the electrical connectors of panels 14 and 16. It will be noted that the electrical connectors 66 and 64 associated with panels 14 and 16 are not directly engaged as in the FIG. 6 arrangement, with the sidewardly facing socket 72 of connector 66 of panel 14 engaging the end socket 68 of connector 66 of panel 128, and with the end socket 68 of connector 64 of panel 16 engaging the sidewardly facing socket 72 of electrical connector 66 of panel 128. With this arrangement, all of the electrical sockets are in the position of socket 64 in FIG. 6, with none extending past the stem 24 to the position of connector 66 in FIG. 6.

FIG. 8 is a view similar to that shown in FIG. 7, except adding another electrified panel 130 to the intersection of panels 14, 16, and 128, to form a cross configuration. Again, either end of panel 130 may be placed at the panel intersection, and for purposes of example it will be assumed that it is the end having the connector referenced 64. A simple way to interconnect the four electrical connectors is to first connect two adjoining panels, such as panels 14 and 130, then connect the remaining two adjoining panels 16 and 128, and then advance the electrical connectors towards one another to make two simultaneous electrical engagements. In this arrangement, it will be noted that the electrical connectors completely surround the post stem 24.

FIG. 9 is an exploded perspective view of an electrical power module 132 constructed according to another embodiment of the invention. Electrical power module 132 includes a centrally located terminal block 134, first and second flexible multi-conductor cables 136 and 138, first and second electrical connectors 64 and 66, and up to and including four plug-in receptacles 140. The first and second electrical connectors are given the same references numerals as the electrical connectors of electrical power module 40 as they may be of identical construction.

Terminal block 132 differs from terminal block 48 of electrical connector in the way it receives plug-in receptacles. Terminal block 40 has four receptacle sockets 96, 98, 100 and 102, the access openings of which face the first and second ends 42 and 44 of the electrical power module, ie., the access openings are parallel to the longitudinal axis 46 of the module, and they cooperate with plug-in receptacles 122 which have plug-in terminals at one or both ends. On the other hand, terminal block 134 accepts plug-in receptacles which have male blades on the rear side.

More specifically, terminal block 134 has four receptacle sockets 141, 142, 144 and 146 which are accessed from the side of the terminal block, ie., the sockets, such as socket 140, have access openings 148 which are oriented transversely to the longitudinal axis 46 of the module. Plug-in receptacles 140 have male prongs 150 which extend outwardly from the back of the receptacle, and which are arranged to engage a desired energized circuit of the terminal block 104.

Flexible cables 136 and 138 are commercially available festoon cables wherein the conductors are molded in a flexible electrical insulating material. Any combination of the terminal blocks and cables shown in FIGS. 2 and 9 may be used, e.g., terminal block 40 may use cables 136 and 138, and terminal block 134 may used armored cables 54 and 56, as desired.

FIG. 10 is an exploded perspective view of an electrical power module 40' which is similar to the hereinbefore described electrical power module 40 except for a modification to the terminal block 48, and thus the terminal block is given reference 48' in FIG. 10. The embodiment of the invention set forth in electrical power module 40' is suitable for space dividing systems using post connectors where the depth D of wire way 38 is not sufficient to provide the serpentine length adjustment required to properly position the electrical connectors 64 and 66 relative to the stem 24 of a post 22.

Terminal block 48' has relatively long cable attachment portions 152 and 154 at its axial ends, compared with the length of comparable portions of terminal block 48, and all the wires of the cable are looped within the interior of the extended cable attachment portions 152 and 154, as indicated by broken lines 156 and 158. The armor 58 on cables 54 and 56 is stretchable and retractable within predetermined dimensions which are sufficient to provide the desired length adjustment, with armor 58 retaining its last manually produced length until it is either pushed together or stretched apart to achieve a different length. This adjustment to the length of cables 54 and 56 is thus accomplished without damage to the wires of the cables, by virtue of the cable loops 156 and 158.

FIG. 11 is a perspective view of a power module 160 constructed according to another embodiment of the invention. The embodiment of FIG. 11 is similar to the embodiment of FIG. 2 except in the FIG. 11 embodiment cables 54 and 56 are releasable engaged with a terminal block 162 at first and second axial ends 164 and 166 thereof via connector assemblies 167 and 169. In the FIG. 2 embodiment cables 54 and 56 are fixed to the axial ends 50 and 52 of terminal block 48. Components in FIG. 11 which may be the same as in the FIG. 2 embodiment are given the same reference numerals and will not be described again.

More specifically, cables 54 and 56 have connectors 168 and 170 fixed to their first ends 60, and the first and second axial ends 164 and 166 of terminal block 162 have connectors 172 and 174, respectively. Connectors 168 and 170 may each include a set of shrouded male contacts, or a set of female contacts, as desired. Connectors 172 and 174 would then respectively have either a set of female contacts, or a set of shrouded male contacts. Of course, connectors 168, 170, 172 and 174 may each be provided with hermaphroditic contacts, as hereinbefore described, if desired.

Terminal block may have a plurality of tabs 176, or the like, for retaining the plug-in receptacles 122 shown in FIG. 1. Releasable latches (not shown), would also be associated with each latch assembly 167 and 169, to prevent unwanted disengagement during use.

In summary, there has been disclosed a new and improved electrified space dividing panel system which requires only one electrical module per electrified panel, and which makes all panel-to-panel connections at the ends of adjoining panel, directly between the single electrical modules of the panels themselves, eliminating the need for extra parts such as panel-to-panel jumpers. Each electrical module may be used in a variety of different electrical arrangements or configurations, e.g., it may be used: (1) to accept an electrical feed when only one panel is energized, (2) it may be used when two panels are connected in a straight line, (3) it may be used when two panels intersect at an angle other than 180 degrees, (4) it may be used when three panels intersect, and (5) it may be used when four panels intersect.

I claim:

1. An electrified space dividing panel system including at least first and second vertically oriented panels each having first and second major opposed sides which define panel width and height dimensions, first and second vertically oriented edges which interconnect the first and second opposed sides and define a panel thickness dimension, and an elongated opening which extends between the first and second vertically oriented edges, with the first and second panels being disposed with a vertically oriented edge of one panel closely adjacent to a vertically oriented edge of another panel, the improvement comprising:
    an electrical power module disposed in the elongated opening of each of the first and second panels, with each power module having first and second ends, a longitudinal axis between the first and second ends, and a length dimension between the first and second ends which is substantially equal to the width dimension of the associated panel,
    each electrical power module including a single terminal block having first and second axial ends,
    such electrical power module including a first and second flexible multi-conductor cables having first ends thereof connected to the first and second axial ends of the terminal block, and having second ends, said first and second cables being the only cables directly connected to the single terminal block,
    each electrical power module including first and second electrical connectors at the first and second ends thereof, respectively, integrally attached to the second ends of the first and second flexible cables, respectively,
    each of said first and second electrical connectors having first and second sets of hermaphroditic contacts, with each set being surrounded by a hermaphroditic housing,
    at least one of the first and second sets of hermaphroditic contacts of said electrical connector of the first panel directly engaging one of the first and second sets of hermaphroditic contacts of a said electrical connector of the second panel, with said direct engagement between the hermaphroditic contacts of the electrical connectors of the first and second panels beings at the adjacent vertical edges of the first and second panels.

2. The electrified space dividing panel system of claim 1 wherein the first and second sets of hermaphroditic contacts of each electrical connector are disposed orthogonally to one another 3. The electrified space dividing panel system of claim 1 wherein the single terminal block of each power module includes terminals connected to the first and second flexible cables for receiving at least one plug-in electrical receptacle, and
    at least one plug-in electrical receptacle engaged with said terminals.

4. The electrified space dividing panel system of claim 1 wherein the single terminal block of each power module includes terminals connected to the first and second flexible cables for receiving up to and including four plug-in electrical receptacles, with the terminals being arranged and accessible to receive up to two said plug-in receptacles on each side of the associated panel.

5. The electrified space dividing panel system of claim 1 wherein the single terminal block is located at substantially the midpoint of the electrical power module.

6. The electrified space dividing panel system of claim 1 wherein each electrical power module includes means for adjusting the length dimension between the first and second ends.

7. The electrified space dividing panel system of claim 1 wherein the adjacent vertically oriented edges of the first and second panels are supported by a post common to each, and each power module includes means for adjusting the length dimension between the first and second ends to enable the engagement between the electrical connectors of the first and second panels to be selectively located relative to the post.

8. The electrified space dividing panel system of claim 1 wherein the first ends of the first and second multi-conductor cables are fixedly connected to the first and second axial ends of the terminal block.

9. The electrified space dividing panel system of claim 1 wherein the first ends of the first and second multi-conductor cables are fixedly connected to the first and second axial ends of the terminal block.

10. An electrified space dividing panel system including first, second and third oriented panels each having first and second major opposed sides which define panel width and height dimensions, first and second vertically oriented edges which interconnect the first and second opposed sides and define a panel thickness dimension, and an elongated opening which extends between the first and second vertically oriented edges, with the first, second and third panels being disposed with a vertically oriented edge of each panel closely adjacent to a vertically oriented edge of each of the other panels, the improvement comprising:

an electrical power module disposed in the elongated opening of each of the first, second and third panels, with each power module having first and second ends, a longitudinal axis between the first and second ends, and a length dimension between the first and second ends which is substantially equal to the width dimension of the associated panel, each electrical power module including a single terminal block having first and second axial ends, each electrical power module including first and second flexible multi-conductor cables having first ends thereof connected to the first and second axial ends of the terminal block, and having second ends, said first and second cables being the only cables directly connected to the single terminal block, each electrical power module including first and second electrical connectors at the first and second ends thereof, respectively, integrally attached to the second ends of the first and second flexible cables, respectively, each of said first and second electrical connectors having first and second sets of hermaphroditic contacts, with each set being surrounded by a hermaphroditic housing, a set of hermaphroditic contacts of a said electrical connector of each of the first and second panels directly engaging a different set of hermaphroditic contacts of a said electrical connector of the third panel, with the engagements of the hermaphroditic contacts of the first, second and third panels being at the adjacent vertical edges of the first, second and third panels.

11. The electrified space dividing panel system of claim 10 wherein the first and second sets of hermaphroditic contacts of each of the first and second electrical connectors are arranged at right angles to one another.

12. The electrified space dividing panel system of claim 10 wherein the single terminal block of each power module includes terminals connected to the first and second flexible cables for receiving at least one plug-in electrical receptacle, and at least one plug-in electrical receptacle engaged with said terminals.

13. The electrified space dividing panel system of claim 10 wherein the single terminal block of each power module includes terminals connected to the first and second flexible cables for receiving up to and including four plug-in electrical receptacles, with the terminals being arranged and accessible to receive up to two said plug-in receptacles on each side of the associated panel.

14. The electrified space dividing panel system of claim 10 wherein the single terminal block is located at substantially the midpoint of the electrical power module.

15. The electrified space dividing panel system of claim 10 wherein each electrical power module includes means for adjusting the length dimension between the first and second ends.

16. The electrified space dividing panel system of claim 10 wherein the adjacent vertically oriented edges of the first and second panels are supported by a post common to each, and each power module includes means for adjusting the length dimension between the first and second ends to enable the engagements between the electrical connectors of the first, second and third panels to be selectively located relative to the post.

17. The electrified space dividing panel system of claim 10 wherein the first ends of the first and second multi-conductor cables are releasably connected to the first and second axial ends of the terminal block.

18. The electrified space dividing panel system of claim 10 wherein the first ends of the first and second multi-conductor cables are fixedly connected to the first and second axial ends of the terminal block.

19. An electrified space dividing panel system including first, second, third and fourth vertically oriented panels each having first and second major opposed sides which define panel width and height dimensions, first and second vertically oriented edges which interconnect the first and second opposed sides and define a panel thickness dimension, and an elongated opening which extends between the first and second vertically oriented edges, with the first, second, third and fourth panels being disposed with a vertically oriented edge of each panel closely adjacent to a vertically oriented edge of each of the other panels, the improvement comprising:

an electrical power module disposed in the elongated opening of each of the first, second, third and fourth panels, with each power module having first and second ends, a longitudinal axis between the first and second ends, and a length dimension between the first and second ends which is substantially equal to the width dimension of the associated panel, each electrical power module including a single terminal block having first and second axial ends, each electrical power module including first and second flexible multi-conductor cables having first ends thereof connected to the first and second axial ends of the terminal block, and having second ends, said first and second cables being the only cables directly connected to the single power block, each electrical power module including first and second electrical connectors at the first and second ends thereof, respectively, integrally attached to the second ends of the first and second flexible cables, respectively, each of said first and second electrical connectors having first and second sets of hermaphroditic contacts, with each set being surrounded by a hermaphroditic housing, both sets of hermaphroditic contacts of a said electrical connector of each of the first, second, third and fourth panels directly engaging a set of hermaphroditic contacts of a said electrical connector of two of the remaining three panels, with said direct engagements of the hermaphroditic contacts of the electrical connectors being at the adjacent vertical edges of the first, second, third and fourth panels.

20. The electrified space dividing panel system of claim 19 wherein the first and second sets of hermaphroditic contacts of each of the first and second electrical connectors are arranged at right angles to one another.

21. The electrified space dividing panel system of claim 19 wherein the single terminal block of each power module includes terminals connected to the first and second flexible cables for receiving at least one plug-in electrical receptacle, and at least one plug-in electrical receptacle engaged with said terminals.

22. The electrified space dividing panel system of claim 19 wherein the single terminal block of each power module includes terminals connected to the first and second flexible cables for receiving up to and including four plug-in electrical receptacles, with the terminal as being arranged and accessible to receive up to two said plug-in receptacles on each side of the associated panel.

23. The electrified space dividing panel system of claim 19 wherein the single terminal block is located at substantially the midpoint of the electrical power module.

24. The electrified space dividing panel system of claim 19 wherein each electrical power module includes means for adjusting the length dimension between the first and second ends.

25. The electrified space dividing panel system of claim 19 wherein the adjacent vertically oriented edges of the first and second panels are supported by a post common to each, and each power module includes means for adjusting the length dimension between the first and second ends to enable the engagements between the electrical connectors of the first, second, third and fourth panels to be selectively located relative to the post.

26. The electrified space dividing panel system of claim 19 wherein the first ends of the first and second multi-conductor cables are releasably connected to the first and second axial ends of the terminal block.

27. The electrified space dividing panel system of claim 19 wherein the first ends of the first and second multi-conductor cables are fixedly connected to the first and second axial ends of the terminal block.

28. An electrified space dividing panel system including at least first and second vertically oriented panels each having first and second major opposed sides which define panel width and height dimensions, first and second vertically oriented edges which interconnect the first and second opposed sides and define a panel thickness dimension, and an elongated opening which extends between the first and second vertically oriented edges, with the first and second panels being disposed with a vertically oriented edge of one panel closely adjacent to a vertically oriented edge of another panel, the improvement comprising:

an electrical power module disposed in the elongated opening of the first panel, a pass through jumper disposed in the elongated opening of the second panel, said power module and said pas through jumper having identical first and second ends, a longitudinal axis between the first and second ends, and a length dimension between the first and second ends which is substantially equal to the width dimension of the associated panel, said electrical power module including a single terminal block having first and second axial ends, said electrical power module including first and second flexible multi-conductor cables having first ends thereof connected to the first and second axial ends of the terminal block, and having second ends, said first and second cables being the only cables directly connected to the single terminal block, said electrical pass through jumper having a single flexible multi-conductor cable having first and second ends, said electrical power module and said electrical pass through jumper each including identical first and second electrical connectors at their first and second ends, each of said first and second electrical connectors having first and second sets of hermaphroditic contacts, with each set being surrounded by a hermaphroditic housing, at least one set of the first and second set of hermaphroditic contacts of an electrical connector of the first panel directly engaging one of the first and second sets of hermaphroditic contacts of an electrical connector of the second panel, with said direct engagement between the hermaphroditic contacts being at the adjacent vertical edges of the first and second panels.

29. The electrified space dividing panel system of claim 28 wherein the first and second sets of hermaphroditic contacts, of each electrical connector of both the electrical power module and the electrical pass through jumper, are disposed orthogonally to one another.

30. The electrified space dividing panel system of claim 28 wherein the first ends of the first and second multi-conductor cables are releasably connected to the first and second axial ends of the terminal block.

31. The electrified space dividing panel system of claim 28 wherein the first ends of the first and second multi-conductor cables are fixedly connected to the first and second axial ends of the terminal block.

* * * * *